(Model.)

8 Sheets—Sheet 1.

H. J. FIELDUS.
Platform or Step Register.

No. 240,986. Patented May 3, 1881.

Witnesses
H. L. Fulenwider.
Henry Howson Jr.

Inventor
Harry John Fieldus
by his Attorneys
Howson & Son

N. PETERS, Photo-Lithographer, Washington, D. C.

(Model.)
H. J. FIELDUS.
Platform or Step Register.
No. 240,986. Patented May 3, 1881.
8 Sheets—Sheet 2.
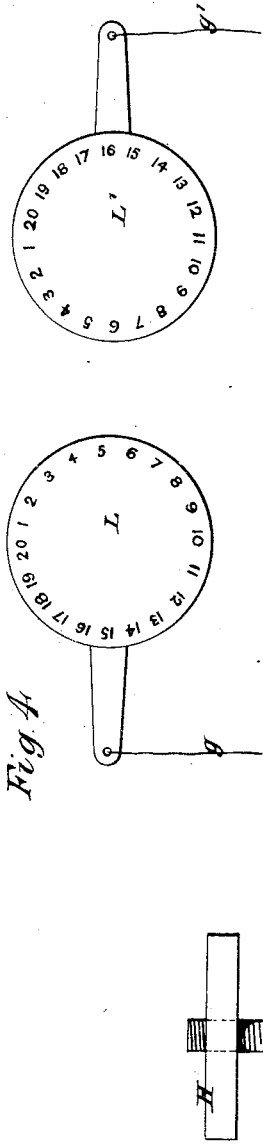
Fig. 4.
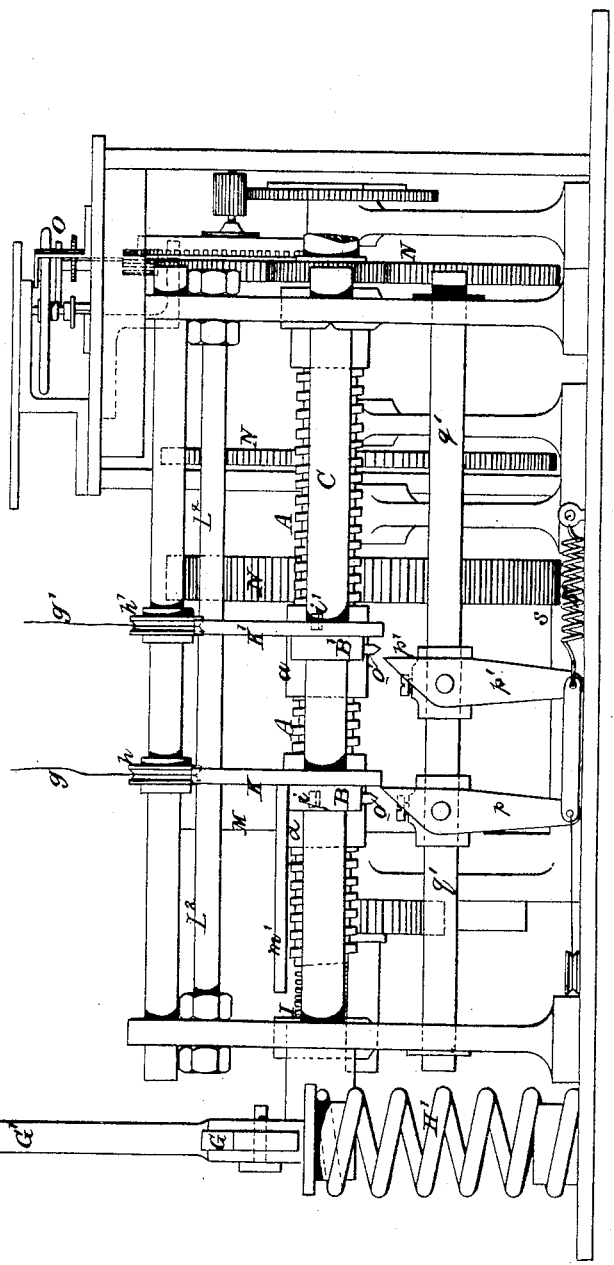
Witnesses
H. L. Fulenwider
Henry Howson Jr
Inventor
Harry John Fieldus
by his Attorneys
Howson & Son
N. PETERS, Photo-Lithographer, Washington, D. C.

(Model.)

8 Sheets—Sheet 4.

H. J. FIELDUS.
Platform or Step Register.

No. 240,986.

Patented May 3, 1881.

Witnesses
H. L. Fulenwider
Henry Howson Jr.

Inventor
Harry John Fieldus
by his Attorneys.
Howson & Son

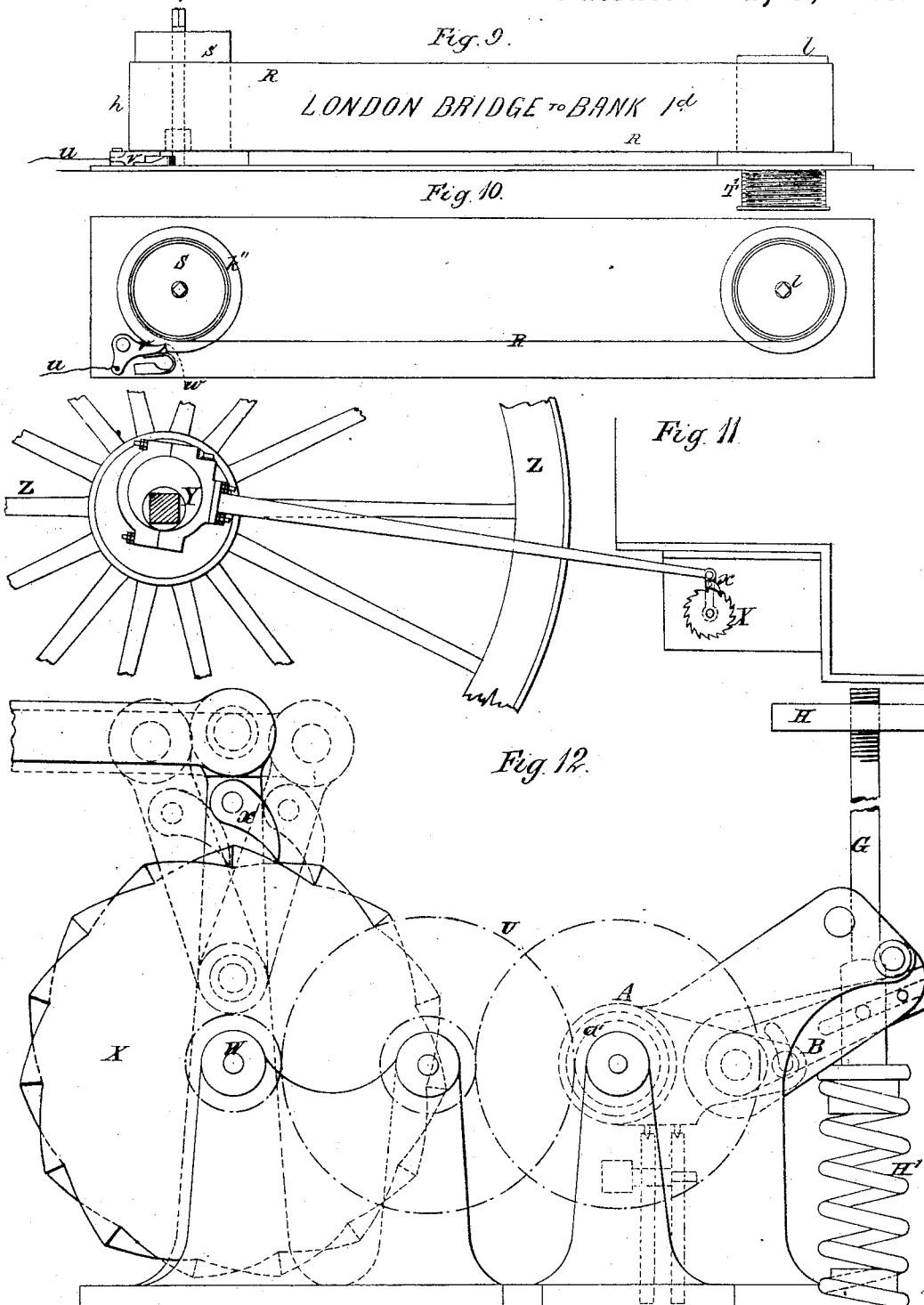

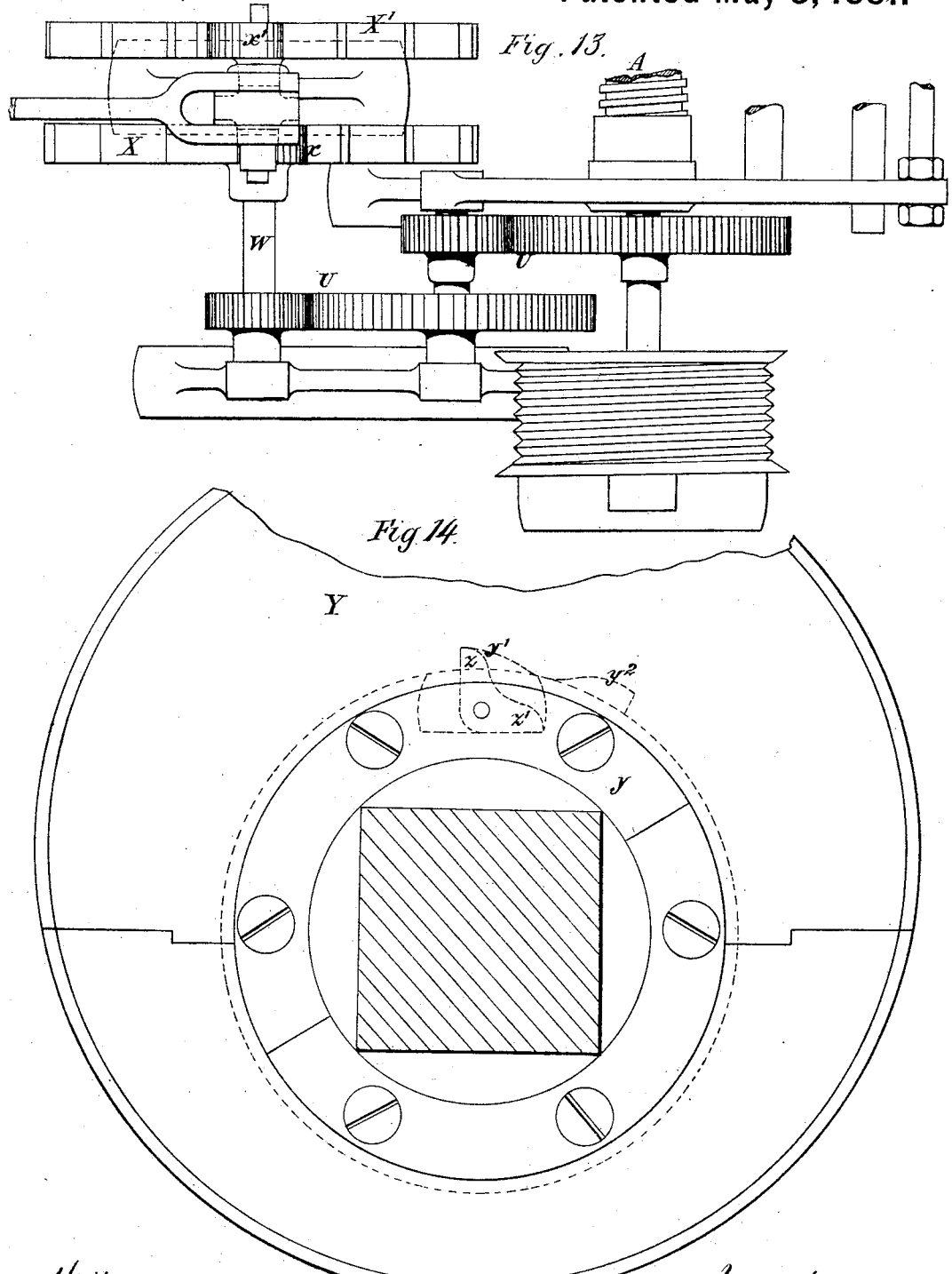

(Model.)

H. J. FIELDUS.
Platform or Step Register.

No. 240,986. Patented May 3, 1881.

Witnesses
H. L. Tubenwider.
Henry Howson Jr.

Inventor
Harry John Fieldus
by his Attorneys
Howson & Son (Model.)

H. J. FIELDUS.
Platform or Step Register.

No. 240,986. Patented May 3, 1881.

Witnesses:
H. L. Fulenwider.
Henry Howson Jr.

Inventor
Harry John Fieldus
by his Attorneys
Howson & Son

United States Patent Office.

HARRY JOHN FIELDUS, OF QUEEN'S ROAD, BRIGHTON, COUNTY OF SUSSEX, ENGLAND.

PLATFORM OR STEP REGISTER.

SPECIFICATION forming part of Letters Patent No. 240,986, dated May 3, 1881.

Application filed July 2, 1880. (Model.) Patented in England November 27, 1879.

*To all whom it may concern:*

Be it known that I, HARRY JOHN FIELDUS, a subject of the Queen of Great Britain and Ireland, and residing at Queen's Road, Brighton, county of Sussex, England, have invented certain Improvements in Passenger-Registers, (for which I have obtained a patent in Great Britain, No. 4,864, November 27, 1879,) of which the following is a specification.

My invention relates to improvements in apparatus for registering the number of persons entering and leaving omnibuses, railway-cars, steamboats, and other conveyances, public and other buildings; and the main object of my invention is to so construct such apparatus that the number of passengers between different stages of the journey will be automatically registered on different dials.

My invention further relates to details of construction more fully described hereinafter.

Figure 1:
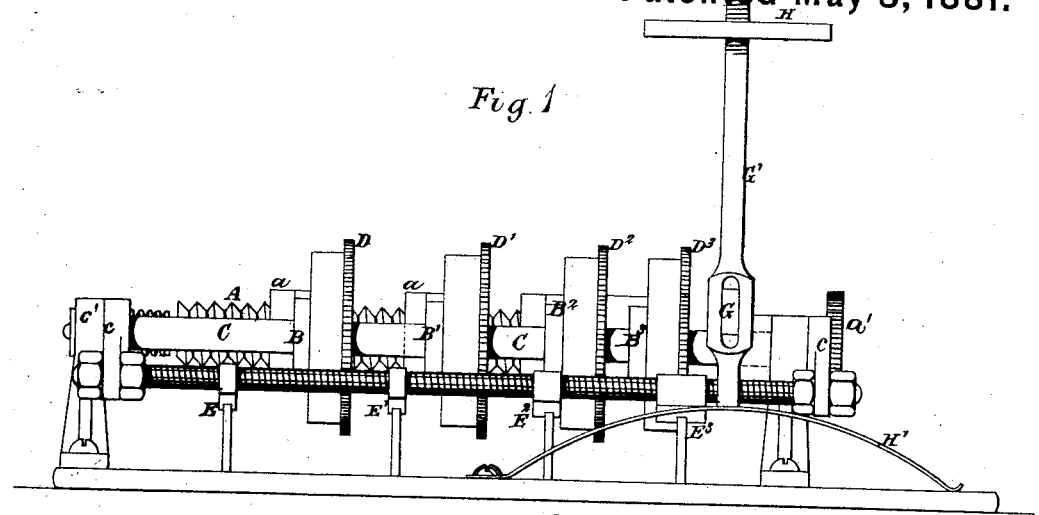
Figure 2:
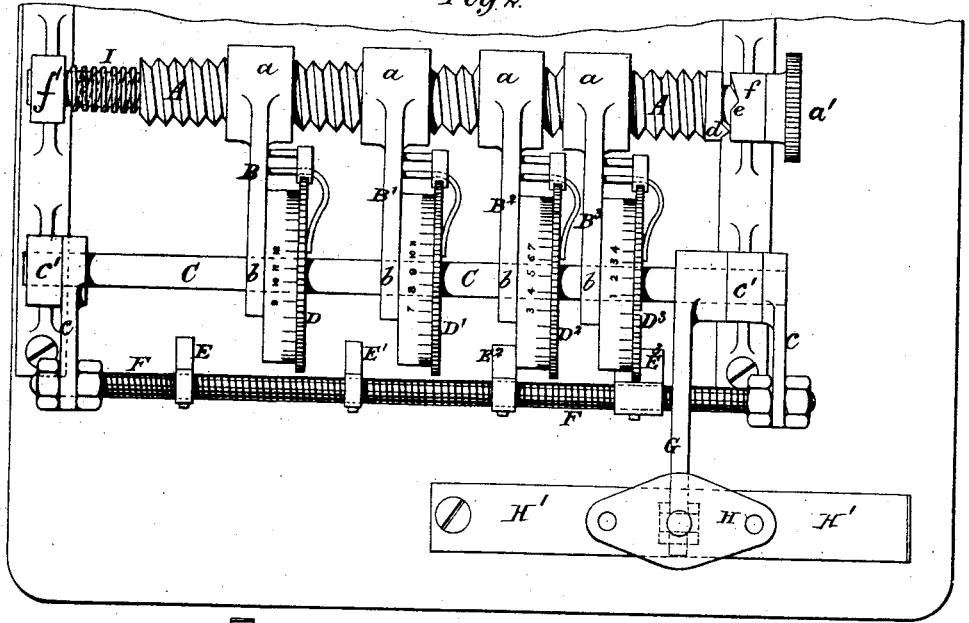
Figure 5:
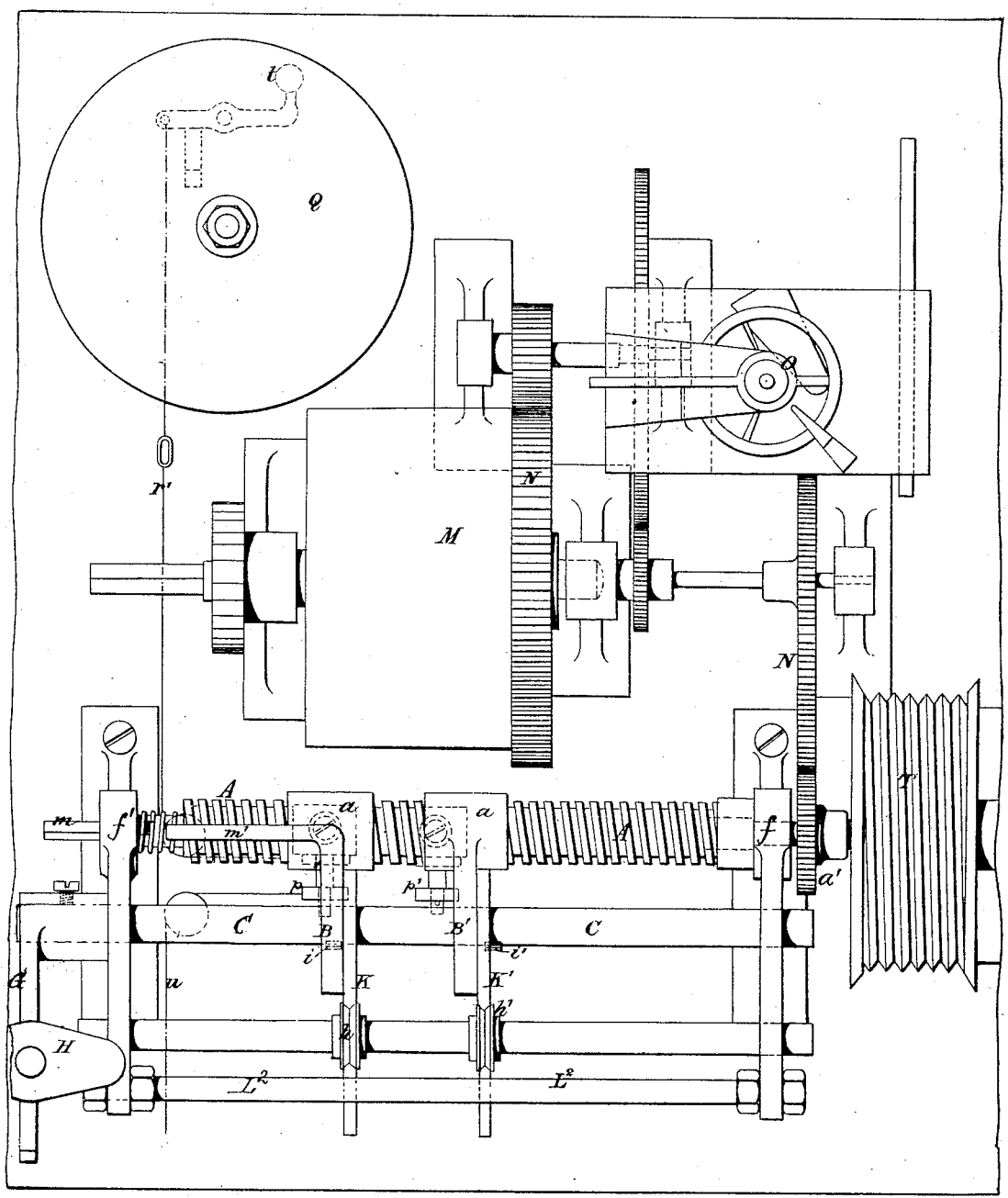
Figure 6:
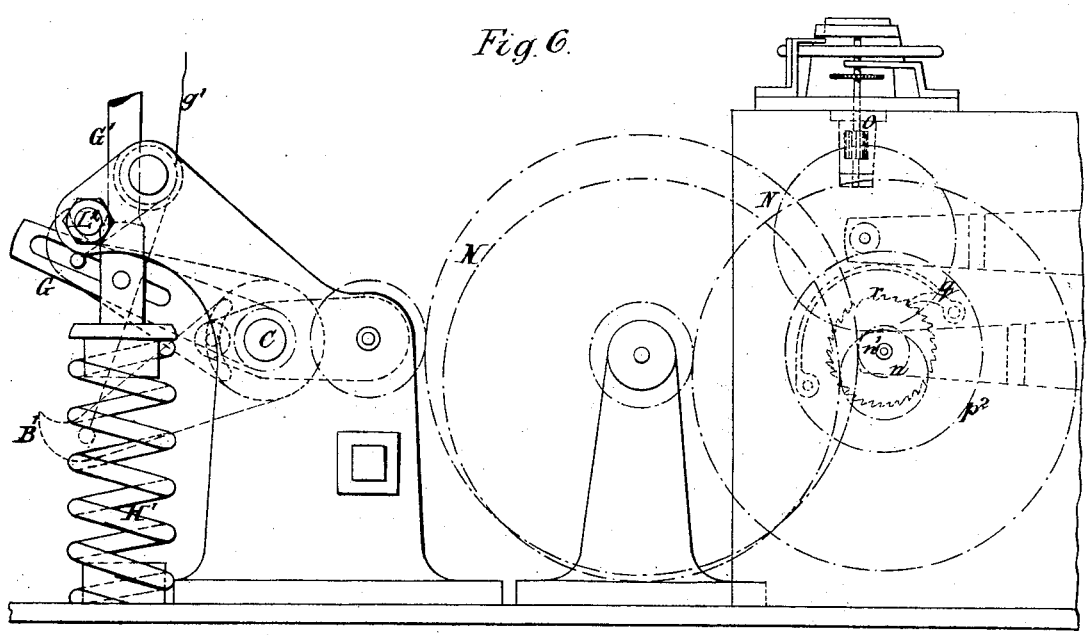
Figure 7:
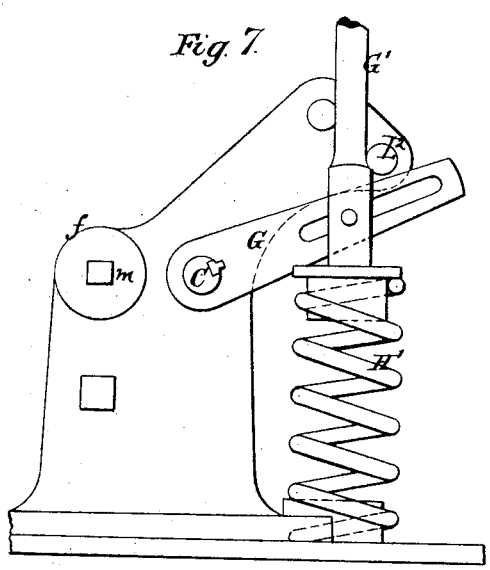
Figure 15:
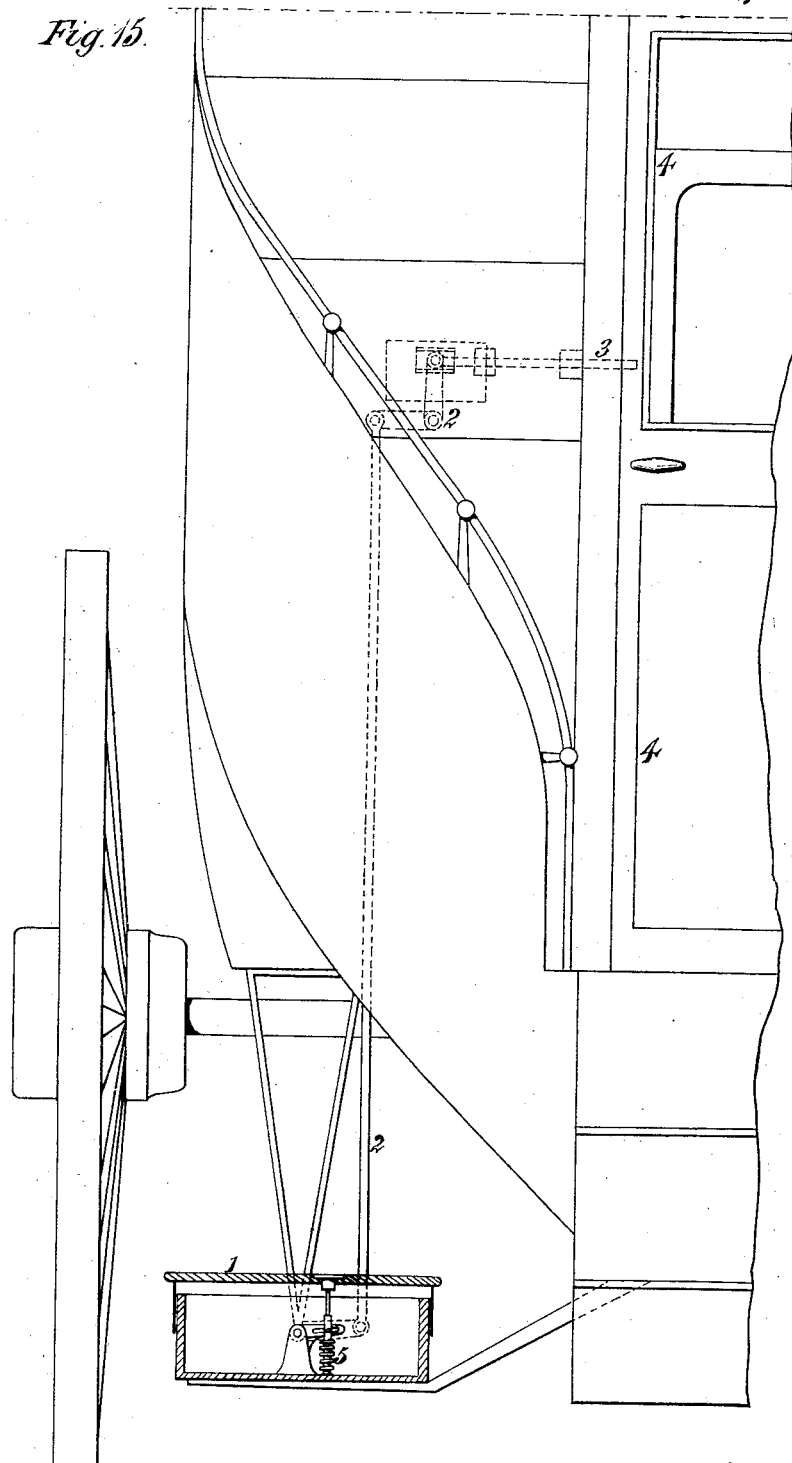
Figure 16:
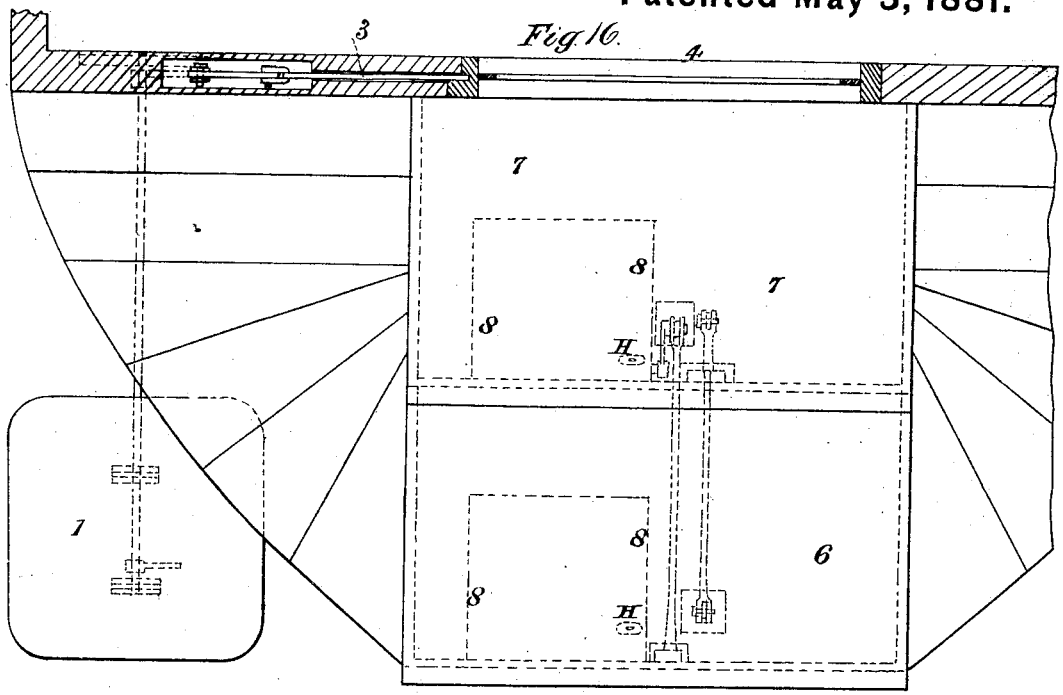
Figure 17:
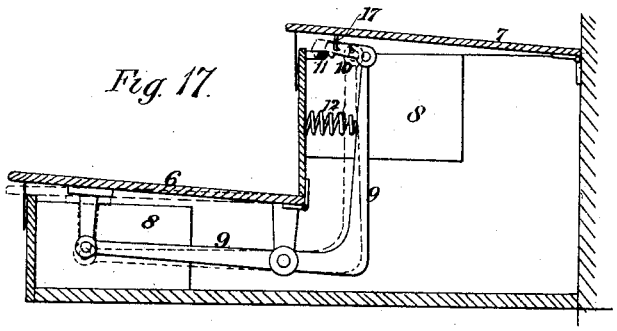
Figure 18:
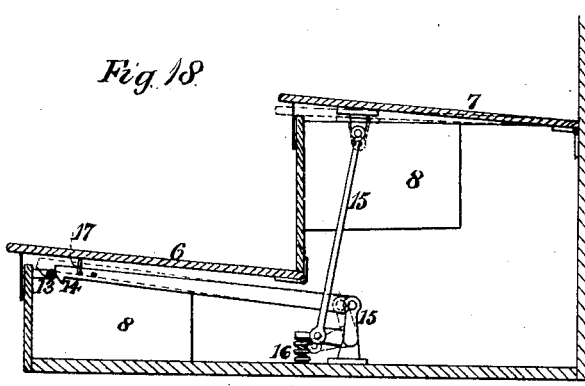

In the accompanying drawings, Figure 1, Sheet 1, is a front view of sufficient of my improved registering apparatus to illustrate my invention; Fig. 2, a corresponding plan, and Fig. 3 an end view; Fig. 4, Sheet 2, a front view of a modified form of my invention; Fig. 5, Sheet 3, a plan view of the same. Figs. 6 and 7, Sheet 4, are end views, and Fig. 8 a vertical section, of the apparatus. Figs. 9 and 10, Sheet 5, are a side view and plan, respectively, of an indicating-tablet to be used in connection with the register; Fig. 11, a view illustrating the mode of driving the screw-shaft from the wheel of a vehicle; Figs. 12, Sheet 5, and 13, Sheet 6, full-sized side view and plan, respectively, of a portion of the mechanism so operated from the vehicle-axle; Fig. 14, a view of the vehicle-axle and its eccentric; Fig. 15, Sheet 7, an end view, partly in section, of a portion of a vehicle with some accessories applied thereto; Fig. 16, Sheet 8, a corresponding sectional plan, and Figs. 17 and 18 are detailed sectional views of the steps.

Figure 3:
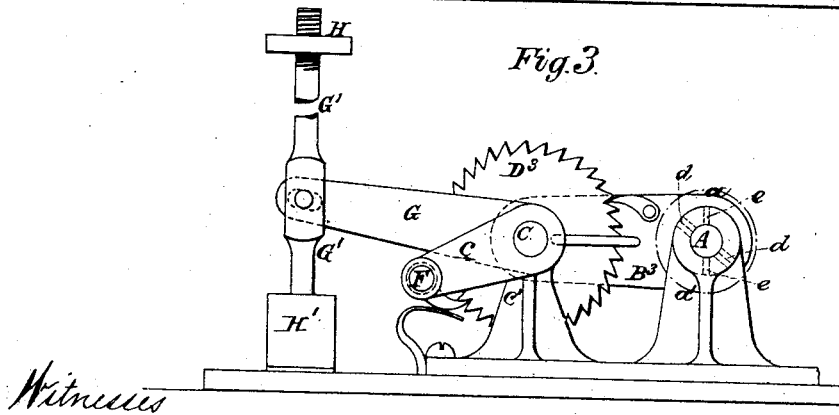

Referring to Figs. 1, 2, and 3, which show the registering apparatus in its simplest form, as intended for use in registering the number of persons entering and leaving a conveyance, A is a screw shaft or spindle, which is mounted in suitable bearings, $f\ f'$, on the frame, and which has rotary motion imparted to it through the cog-wheel $a'$ from suitable clock-work, or from the wheels of the vehicle, as more fully described hereinafter. To this screw-shaft are adapted a series of corresponding nuts or bosses, $a\ a$, each provided with an arm, B, (B', &c.,) which, at its outer end, $b$, fits freely on the shaft C, adapted to bearings $c'\ c'$ parallel with screw-shaft A.

To each arm B (B', &c.) is connected a ratchet-dial, D, (D', &c.,) free to rotate on the said shaft C, but capable of movement longitudinally on the said shaft with the arm B (B', &c.) when the latter is caused to slowly traverse by the rotation of the screw-shaft A.

To the ends of the shaft C are secured arms $c$, carrying a shaft, F, on which is mounted a series of pawls E E', E$^2$, &c., one for each ratchet-wheel. The shaft F is screw-threaded, and the pawls E E', &c., are adapted thereto so as to be capable of adjustment thereon to any desired position. On the shaft C is also mounted a lever, G, which has a pin-and-slot connection with an upright rod, G', carrying a foot-plate, H, to be operated by the foot of the passenger on entering or leaving the vehicle. The rod G' is normally held in an elevated position by a spring, H'.

The following is the operation of the device: Upon a person entering the vehicle and stepping upon the foot-plate H a partial rotary motion is imparted to the shaft C, whereby the shaft F is moved through a certain angle round the shaft C, and the pawls E E', &c., mounted on the shaft F, consequently partake of such motion. One only of the pawls, however, is for the time being in gear with its ratchet-dial, so that only one dial will register. Let it be assumed that the ratchet-wheel D is in action with its pawl E, as shown in Figs. 1 and 2. When, therefore, the pawl-shaft F is moved in the manner hereinbefore described, the pawl E is caused to force the ratchet-wheel D round to the extent of the distance between the teeth, and thus record 1 on the ratchet-dial, which is suitably graduated. On the entrance of the next person a fresh impulse is given to the ratchet-wheel, and a record made thereof, and so on in succession as often as persons enter the vehicle. During this time the ratchet-wheel D is being slowly moved along the shaft C by reason of the revolution of the screw A imparting a traversing motion to the arm B, and by the time that the first stopping-place or stage of the journey is reached the ratchet-wheel D will have been brought out of the range of the pawl E, the pawls retaining the same relative positions—that is to say, having no end motion. As, however, the arms B′, B², &c., receive also a traversing motion similarly to the arm B, by the time that the ratchet-wheel D is disengaged from its pawl E the ratchet-wheel D′ will be brought within the range of the pawl E′, and entrances effected between the first and second stopping-places or stages will be recorded by the ratchet-wheel D′. On the second stopping-place or stage being arrived at, the ratchet-wheel D′ will be out of the range of its pawl E′, and the ratchet-wheel D² will have been brought within the range of its pawl E². The latter ratchet-wheel and pawl will then continue in action until the third stopping-place or stage is arrived at, when the fourth ratchet-wheel, D³, and pawl E³ are brought into action, this position of the parts being represented in the drawings.

A similar apparatus with corresponding foot-plate is appropriated for the registration of exits in like manner.

It is obvious that the pawls may be made of a width and arranged in positions suitable to the length of the different divisions of the journey.

It is found advantageous to provide on the end of the screw-shaft A radial ribs or projections $d$, arranged, in relation to similar beveled notches or slots $e$ in the corresponding bracket or bearing $f$, in such a manner that by the time a stopping place or stage is arrived at the projections $d$ of the screw-shaft A will have been brought opposite the notches or slots $e$, into which they are forced by a coiled spring, I, on the opposite end of the shaft, thus effecting the instantaneous disengagement and engagement of the respective ratchet-wheels and pawls. The ribs $d$ are afterward gradually withdrawn from the notches or slots $e$ by the conjoint action of its beveled surface and the continued revolution of the screw.

The thread of the screw A may be made of any desired shape or pitch, and, if desired, the screw may be made in longitudinal sections.

Figs. 4 and 5, 6 and 7 and 8, show the apparatus slightly modified and with the addition of accessories which increase its utility and efficiency.

Figure 8:
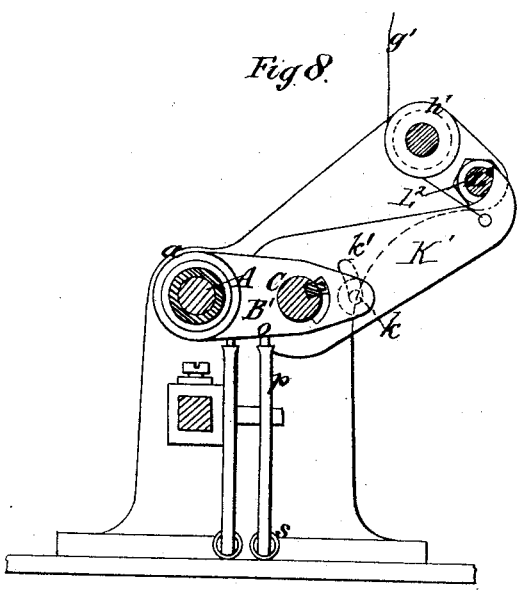

In this construction of the register the ratchets D D′, &c., shaft F, and pawls E E′, &c., of Figs. 1, 2, and 3, are dispensed with, and the arms B B′, carried by the bosses $a$ $a$, (two only being shown in these figures 4, 5, &c.,) carry, instead of the said ratchet-dials, levers K K′, which are connected by wires $g$ $g'$ passing round loose pulleys $h$ $h'$, with suitable dials, L L′, placed in any convenient part of the vehicle. The levers K K′ are connected to their arms B B′ by headed pins $k$ passing through curved slots $k'$ in said levers, as shown in Fig. 8, so that the said levers K K′ must move longitudinally on the shaft C with the arms B B′, but may have a partial rotary motion around the axis of said shaft C independent of the arms B B′. The shaft C is provided with short feathers $i$ $i'$, one for each lever K K′, each of which is provided with a notch for the reception of the feather $i$, ($i'$,) when the rotary motion of the screw-shaft A shall move the arm B (B′) and its lever K (K′) over the said feather.

As described with reference to Figs. 1, 2, and 3, the shaft C is provided with an operating-lever, G, rod G′, step-plate H, and spring H′. (Spiral in this instance.) Hence, supposing the screw A to have caused the notch in the lever K to come into gear with the feather $i$, the lever K′ and feather $i'$ being then out of gear, a depression of the lever G, caused by the entrance of a passenger, will operate the lever K and cause a record on the dial L. On arriving at the end of the first stage or stopping place, the lever K will become disengaged from the feather $i$, and the lever K′ will become engaged with the feather $i'$, so that entrances or exits will then be recorded on the dial L′. Similarly, when additional levers and dials are employed, one comes into action as the preceding one is thrown out.

It will be understood that additional dials L L′ are employed to record exits, the said dials corresponding to a separate apparatus appropriated to that purpose.

In order to insure that the levers K K′ shall always resume one exact position after being depressed, so that the feathers $i$ $i'$ on the shaft C may engage them at the desired moment, the striking-shaft L² is provided, in contact with which the levers are normally maintained under the action of the wires $g$ $g'$, and a spring or weight connected with the dials to which the said wires are attached.

M shows a spring-barrel, which may be used for imparting motion to the screw-shaft A by means of gearing N, the spring being controlled by an ordinary escapement or other motion, O, as desired.

When it is required to wind back the screw-shaft A, this operation may be performed by means of an ordinary key at the end $m$ of the shaft A, Fig. 5, the escapement or other controlling movement O being provided with a special arrangement for allowing it to be reversed without injury. This arrangement consists in mounting the pinion $n$, Fig. 6, forming part of the train of gearing N, Fig. 5, loose upon its shaft $n'$, on which shaft is secured a spur-wheel, $p^2$, for actuating the escapement O. Motion is transmitted to such shaft $n'$ by means of a pawl, $q$, attached to the wheel $p^2$ and engaging with a ratchet-wheel, $r$, attached to or forming part of the pinion $n$. In order to prevent all liability of the screw-shaft A being overwound a bracket, $m'$, Figs. 4 and 5, is provided on the boss or nut $a$, carrying the arm B, which forces the key from the end $m$ of the shaft when the arms B B' have been screwed back to the required positions.

I also combine with the apparatus a gong, Q, which is caused to sound at each stage of the journey, so as to furnish an audible signal to notify that a stopping-place is arrived at. This gong Q, Fig. 5, is operated from pivots $o$, carried by the nuts $a$, Figs. 4 and 5, through the intervention of levers $p\ p'$, adjustably mounted upon a shaft, $q'$, and of wires or cords $r'$, the arrangement being such that when the feather $d$, on the end of the screw A, as illustrated in Fig. 2, flies into the notch $e$, the lever $p$ or $p'$, Figs. 4 and 5, which for the time being is in action, instantaneously rebounds under the tension of a spring, $s$, causing the hammer $t$ to sound the gong.

The levers $p\ p'$ may also be connected by a wire or cord, $u$, Fig. 5, with a detent, $v$, which engages in a notch, $w$, in a revolving tablet, R, Figs. 9 and 10, during the passage from one stage to another of a journey, but is released as each stopping-place or stage is arrived at, thereby allowing the tablet to revolve, by the action of a spring in the barrel S, until the notch $w$ is again brought opposite to the detent $v$, when the motion of the tablet is again suspended. This tablet is arranged to show the fares to be paid for each division of the journey, and by the motion of the tablet, when a stage is arrived at, the correct fare is displayed for the succeeding division of the journey. The tablet is wound back simultaneously with the arms B B', by means of pulleys T T', Fig. 5, and a cord, by the act of turning the screw-shaft A in a direction the reverse of that of its normal motion, as hereinbefore explained.

In the example illustrated the tablet, when in action, is unwound from a roller, $k^2$, and wound onto a roller, $l$; but it is obvious that it may be otherwise arranged and that other mechanical contrivances than those hereinbefore described may be used for operating and controlling the tablet, such, for example, as multiplying-gear, to obtain an increased motion of the tablet for a given motion of the spring.

Fig. 11, 12, 13, and 14 illustrate the mode of operating the screw-shaft from the wheels of the vehicle. For this purpose toothed gearing or friction-gearing U may be used to transmit motion to the screw-shaft A from a shaft, W, having secured thereon a ratchet-wheel, X. This ratchet-wheel may be operated by a pawl, $x$, and eccentric Y, Fig. 11, or similar appliance from the wheel Z or other moving part of the vehicle. It is desirable to provide means to cause the motion of the screw A to be reversed in the case of the vehicle going backward. For this purpose an additional ratchet-wheel, X', having its teeth cut so as to lead in an opposite direction to the teeth of the ratchet-wheel X, and an additional pawl, $x'$, may be used, as shown in Figs. 12 and 13, the pawl $x'$ being connected to the eccentric Y, and being raised out of action when the vehicle is going forward, and being in action while the pawl $x$ is raised out of action when the vehicle is going backward. In order to throw one pawl out of action, and to bring the other pawl into action, as required, I may employ the arrangement illustrated in Fig. 14. According to this arrangement the eccentric Y is mounted loose upon a disk, $y$, attached to the nave of the wheel Z, and is caused to turn with the wheel by means of an angular or bell-crank lever, $z\ z'$.

Cam-grooves $y'\ y^2$ are provided in the eccentric Y, by means of which the lever $z\ z'$ is turned upon its center, so as to cause the opposite arm ($z$ or $z'$, as the case may be) to that which has been in action to engage with the eccentric when the motion of the wheel is reversed. The motion of the levers $z\ z'$ may thence be transmitted to the pawls $x\ x'$, so as to engage and disengage the required pawl by rods or other suitable mechanical connections.

I find it convenient to set apart a step for the conductor, and so arrange it that the entrance or exit of passengers is debarred unless the conductor be upon the place appointed for him. This arrangement is illustrated in Figs. 15 and 16. 1 is the conductor's step, which is made depressible and connected by a rod and bell-crank, 2, or similar appliance, with a locking-bolt, 3, by which the door 4 of the vehicle is automatically locked under the action of a spring, 5, when the conductor is not in his place.

It is also found convenient, in the case of vehicles having two steps, to appropriate one of the steps—say, for example, the bottom step—to the recording of entrances, and the other (or top) step to the recording of exits, and to cause the depression of the one step to lock the other. This arrangement will be understood by reference to Figs. 16, 17, and 18, of which Fig. 17 represents the devices for locking the top step, while Fig. 18 shows the devices used for locking the bottom step. In these figures, 6 is the bottom step, and 7 is the top step, each of which is in one with or connected to the foot-plate H of a recording apparatus, constructed in the manner hereinbefore described, and the position of which is indicated at 8 8. Either of these steps in the normal condition of the parts is free to be depressed, and to actuate the pawls or the levers of the recording apparatus; but when one is being depressed—say, for example, the bottom step, 6—by the entrance of a passenger, the other—viz., the top step, 7—is locked, and vice versa.

Referring to Fig. 17, the bottom step, 6, when depressed, as shown by dotted lines, is caused to act through the intervention of a lever, 9, so as to interpose a bolt, 10, between the top step, 7, and a fixed projection, 11, the bolt being withdrawn, assisted by the action of a spring, 12, on the pressure being removed. Similarly in the case of a depression of the top step, 7, by a passenger leaving (see Fig. 18) the bottom step, 6, is locked by the interposition between it and a fixed projection, 13, of a bolt, 14, the latter being operated through the intervention of levers and rods 15, while a spring, 16, is employed for the purpose of assisting to restore the parts to their normal positions.

In order to insure that the step which has been locked by the passenger passing over the other step shall remain locked until the passenger has trodden upon such locked step, and shall then be unlocked, the springs 12 and 16 are made of only sufficient power to move the levers 9 and 15 when the locking-bolts 10 and 14 have been released; and the release of such locking-bolts is effected by means of catches 17, which engage with pins on the bolts 10 and 14. When the locked step is depressed by the passenger to the extent permitted by the locking-bolt, and when the locked step is raised again by means of the spring H' of the register before described on the pressure being removed, the bolts 10 and 14 are liberated by the action of the catches 17, the springs 12 and 16 then restoring the parts to their normal position.

The invention is also applicable for recording the number of persons entering or leaving a building, so as to provide a check upon the receipts of the collector in cases where the price of admission varies with the time or stage of a performance, for example, the apparatus being in this case actuated by clock-work.

I claim as my invention—

1. In a registering apparatus, the combination of a rotating screw-shaft and a series of bosses adapted thereto, and having arms with a corresponding series of recording wheels or dials, an oscillating shaft and devices, substantially as described, whereby the said oscillating shaft operates the registering wheels or dials, one at a time, and as one wheel is thrown out of action another is brought into action, all substantially as set forth.

2. In a registering apparatus, the combination of a series of registering dials or wheels, a series of arms connected to the said dials or wheels, and a rotary screw-shaft carrying said arms, with an oscillating shaft for acting on the registering devices of the dials, and a spring platform or step for imparting motion to the oscillating shaft, all substantially as set forth.

3. In a registering apparatus, the combination of a rotary screw-shaft, a series of arms, B B', carried and acted on thereby with an oscillating shaft, C, a series of slotted levers, K K', connected to the said arms and operating the registering-dials, the said shaft C being provided with feathers adapted to enter the slots in said levers, all substantially as specified.

4. The combination of a series of registering-dials, a corresponding series of arms, and a rotary screw feed-shaft having at one end a rib or feather, and acted on at the other by a spring with a bearing having a beveled notch for the reception of said rib, and with an oscillating shaft and devices, substantially as described, for causing said oscillating shaft to operate one or the other of the dials, substantially as set forth.

5. The combination of a notched rotating barrel for rolling or unrolling a tablet, with a screw-shaft and a series of traveling arms, a spring-detent, and intermediate mechanism for causing one or the other of the arms to act on the said spring-detent at intervals, as and for the purpose specified.

6. The combination of the screw-shaft, its traveling arms and gearing, reverse ratchet-wheels X X' and pawls, with eccentric Y, having notches $y'$ $y^2$, wheel, and lever $z$ $z'$.

In testimony whereof I have signed my name to this specification in the presence of two subscribing witnesses.

HARRY JOHN FIELDUS.

Witnesses:
CHAS. MILLS,
JOHN JAMES,
Both of 47 Lincoln's Inn Fields, London.